Figures 1, 2:
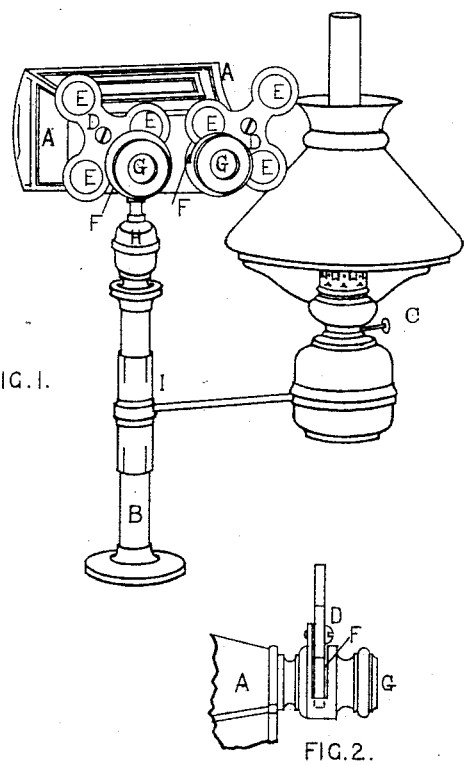

(No Model.)

J. LYONS.
STEREOSCOPE.

No. 327,449. Patented Sept. 29, 1885.

WITNESSES:

INVENTOR.
Joseph Lyons
by W. H. Babcock
Attorney.

UNITED STATES PATENT OFFICE.

JOSEPH LYONS, OF LONDON, ENGLAND.

STEREOSCOPE.

SPECIFICATION forming part of Letters Patent No. 327,449, dated September 29, 1885.

Application filed April 1, 1885. (No model.) Patented in England September 12, 1884, No. 12,329.

*To all whom it may concern:*

Be it known that I, JOSEPH LYONS, a subject of the Queen of Great Britain, residing at 230 Whitechapel Road, London, in the county of Middlesex, England, have invented certain new and useful Improvements in Chromatic Stereoscopes with Lamps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention refers to a method of combining with a stereoscope certain colored glasses, by means of which pleasing optical effects are produced upon the mind of the beholder while observing a suitable picture or stereoscopic slide inserted in the instrument. In order to better observe the picture, a lamp is mounted upon the stand which carries the stereoscope. Three colored glasses—red, green, and violet—are secured within a frame, and two such frames are mounted upon a stereoscope by means of a pivot or axis passing through the center of the frame. This frame is so placed as to be capable of revolution upon its axis, and to bring either of the three pieces of colored glass within the line of sight between the eye-piece on each side of the instrument and the picture, a slot or opening being formed behind each eye-glass upon the plane of revolution of each pivoted frame for its passage. By making the colored glasses of a disk form and arranging them within the frame equidistant from the center and each other they may be turned or revolved so as to bring, for example, the two red glasses between the eye of the observer and the picture, or a red and a green or other combination of colors, at will, and thus impart to the observer great brilliancy of color and effect, although an ordinary plain or uncolored stereoscopic slide be used.

It will be seen that by this method of combining colored glasses with a stereoscope the light falling upon the picture is not changed or modified in any way, but the optical effect is produced upon the optic nerve or the mind of the observer, and as many different effects can be obtained by the manipulation of one or both of the frames, the interest felt in each pictorial subject is greatly increased.

The stereoscope is mounted upon a stand or pillar, which is also made use of for carrying any suitable kind of lamp for illuminating the picture. This lamp, as likewise the stereoscope, is made adjustable to suit the convenience of various observers.

The glasses may be varied in color or number.

In the accompanying drawings, Figure 1 represents a perspective view of a chromatic stereoscope and lamp embodying my invention, and Fig. 2 represents an elevation of an eye-piece embodying my invention.

In the figures, A represents the body of the stereoscope; B, the stand or support; C, the lamp; D, the pivoted frames; E, the colored glasses; F, the slot or opening for the frame; G, the eye-pieces. H is a ball-and-socket joint for varying the vertical or the horizonal angle of the instrument, and I a sleeve by which the lamp is carried.

Having thus described my invention, what I claim as new is—

1. A stereoscope provided with a support, a sleeve surrounding said support, and a lamp-supporting arm attached to said sleeve, all substantially as stated.

2. A stereoscope eye-piece, in combination with a frame pivoted to said stereoscope and containing two or more differently-colored panes or plates of glass, which are arranged to be brought at will across the sight of said eye-piece, for the purpose set forth.

3. A pair of slotted eye-pieces for a stereoscope, in combination with two frames pivoted to said stereoscope and arranged to turn in the slots of said eye-pieces, respectively, each frame being provided with plates of glass of different colors arranged to come into its eye-piece as the frame is turned, to color the view, substantially as set forth.

4. In combination with a stereoscope, one or more movable frames provided with separate panes or plates of glass having different colors, said frame or frames being attached to said stereoscope, but movable to present any one of said colors in the line of vision, substantially as set forth.

In testimony whereof I affix my signature in the presence of two witnesses.

JOSEPH LYONS.

Witnesses:
   J. S. FAIRFAX,
   H. G. BISHOP.